United States Patent [19]
Nioche et al.

[11] Patent Number: 5,943,238
[45] Date of Patent: Aug. 24, 1999

[54] HIGH-SPEED PERSONALIZATION MACHINE

[75] Inventors: Gérard Nioche, Clery St Andre; Simon Ormerod, Loury, both of France

[73] Assignee: Gilles Leroux, S.A., Semoy, France

[21] Appl. No.: 08/821,179

[22] Filed: Mar. 19, 1997

[30] Foreign Application Priority Data

Mar. 19, 1996 [FR] France ................................. 96 03410

[51] Int. Cl.⁶ .......................... G06F 19/00; H05K 3/20
[52] U.S. Cl. ...................... 364/468.28; 29/825; 29/831; 29/846; 29/564.1; 235/380; 235/475; 257/679; 414/223
[58] Field of Search ..................... 364/468.28, 478.13; 235/375, 380, 475, 479, 488, 478; 257/679; 29/564.1, 825, 831, 846, 827; 414/223

[56] References Cited

U.S. PATENT DOCUMENTS

| | | | |
|---|---|---|---|
| 4,825,054 | 4/1989 | Rust et al. | 235/380 |
| 4,827,425 | 5/1989 | Linden | 364/478.13 |
| 4,866,259 | 9/1989 | Bonnemoy | 235/475 |
| 4,996,411 | 2/1991 | Rebjock | 235/488 |
| 5,332,889 | 7/1994 | Lundstrom et al. | 235/380 |
| 5,614,707 | 3/1997 | Lundstrom et al. | 235/479 |

FOREIGN PATENT DOCUMENTS

| | | |
|---|---|---|
| 8607989 | 9/1986 | Germany . |
| WO 94/15306 | 7/1997 | WIPO . |

*Primary Examiner*—William Grant
*Assistant Examiner*—Sheela S. Rao
*Attorney, Agent, or Firm*—Nixon & Vanderhye P.C.

[57] ABSTRACT

A high-speed personalization machine has a portable object transfer device for transporting objects that incorporate an integrated circuit which contains at least one memory. The machine has a turning plate whose axis of rotation is inclined or parallel with respect to a transfer line and the plate is equipped with a number of connecting devices and an electronic card that is associated with each connecting device. Each electronic card is connected to a computerized management system and is arranged radially with respect to the turning plate so that the computerized personalization management system makes it possible to manage personalization of all of the cards.

12 Claims, 5 Drawing Sheets

HIGH-SPEED PERSONALIZATION MACHINE

BACKGROUND OF THE INVENTION

1. Field of the Invention

This invention pertains to a high-speed personalization machine.

2. Related Art

Personalization machines for portable objects such as microchip cards and, in particular, so-called smart cards, i.e., cards which incorporate a microprocessor or microcalculator, are known.

In the personalization machines of the prior art, several fixed personalization stations (which a manipulator arm supplies with smart cards to be personalized) are used. The drawback to this kind of device is that the number of personalization stations is limited by the speed of the manipulator arm, which has to transport the cards from a prehension station to the personalization station and then, after personalization is performed, pull them out in order to put them back into the production line. One of the effects of this technology is that the production rate is limited by the speed at which the manipulator arm moves to the personalization stations.

An attempt has been made to remedy this drawback by placing at the outlet of the production line several personalization stations that operate in parallel. To be sure, this approach makes it possible to achieve acceptable production rates, but it has disadvantages for the personalization of cards that are intended for certain applications in which each personalized card includes a number and in which the sequence of the numbers is supposed to be continuous. In this kind of application, the management of incidents in the above-mentioned technology quickly becomes complicated, and in practice it becomes necessary to reduce the number of personalization stations in order to be able to deal with incidents, thus reducing the production rate.

SUMMARY OF THE INVENTION

A first object of this invention is thus to propose a high-speed personalization station, eliminating the use of a manipulator arm.

This object is achieved by virtue of the fact that the high-speed personalization machine that includes a portable object-transfer device (for transferring objects which incorporate an integrated circuit that includes at least one memory) is characterized in that it comprises a rotating plate whose axis of rotation is inclined or parallel with respect to the transfer line, whereby the plate is equipped with a number of connecting devices and an electronic card that is associated with each connecting device, with each electronic card being connected to a computerized management system and being arranged radially with respect to the plate, whereby the computerized personalization management system makes it possible to manage personalization of all of the cards.

According to another special feature, each connecting device includes a fixed plate and a movable assembly (that is guided in translation toward the fixed plate) and includes a connecting head, whereby said movable assembly is continuously biased by a pressure device in the direction of the fixed plate, which is integral with the turning plate.

According to another special feature, each connecting device is brought in succession to a loading station and an unloading station.

According to another special feature, the rotating plate is shaped as a truncated cone, such that one face of the cone is parallel to the transfer device.

According to another special feature, the plate has driving and angular positioning means that make it possible to stop each plate at the level of the portable objects and in alignment with the guide means of the portable object transfer system.

According to another special feature, the machine has means of controlling the advance from one station to another of the transfer device and of stopping a portable object opposite the connecting device that is put in the path of the transfer device.

According to another special feature, the machine has means of controlling the sequencing and means of managing the personalization process.

Another object of the invention is to obtain a personalization machine that makes it possible to personalize a number of cards at a high rate of speed, all the while ensuring the continuity of the card personalization numbers.

This object is achieved by virtue of the fact that the sequencing control means trigger a replacement sequence when the personalization management means signal a problem with personalization on a portable object, with at least one connecting device that is located in a position on the plate being kept in a backup position and being loaded with a backup portable object, whereby the personalization management means trigger the personalization of the portable object in this backup position when the management means have detected a personalization problem on a card, which is classified as defective and is placed in a connecting device; the sequencing control means ensure the unloading of the personalized portable objects that are located in front of the defective personalized object and then the unloading of the defective portable object, as well as a personalization cycle on the card in the backup position, which at the end of a personalization cycle is unloaded onto the transfer device; the sequencing control means then ensure the loading of a new backup card into this backup position before returning to the position that makes it possible to unload the portable object that is located immediately behind the defective portable object.

According to another special feature, the machine has a card unstacking device at the entrance to the machine, a stacking device at the exit from the machine, an electrical test station between the personalization plate and the unstacking device, and an ejection station in front of the station for loading cards onto the personalization plate.

According to another special feature, the machine has an ejection station at the exit from the personalization plate.

According to another special feature, the ejection station is activated when a card with faulty personalization passes in front of this station.

According to another special feature, downstream from an ejection station, which is located downstream from the personalization plate, a turning station that is associated with an ink marking station and the card stacking device.

BRIEF DESCRIPTION OF THE DRAWINGS

Other special features and advantages of this invention will become clear from reading the description given hereinafter, which refers to the attached drawings, where.

DETAILED DESCRIPTION OF EXEMPLARY EMBODIMENTS

Figure 1:
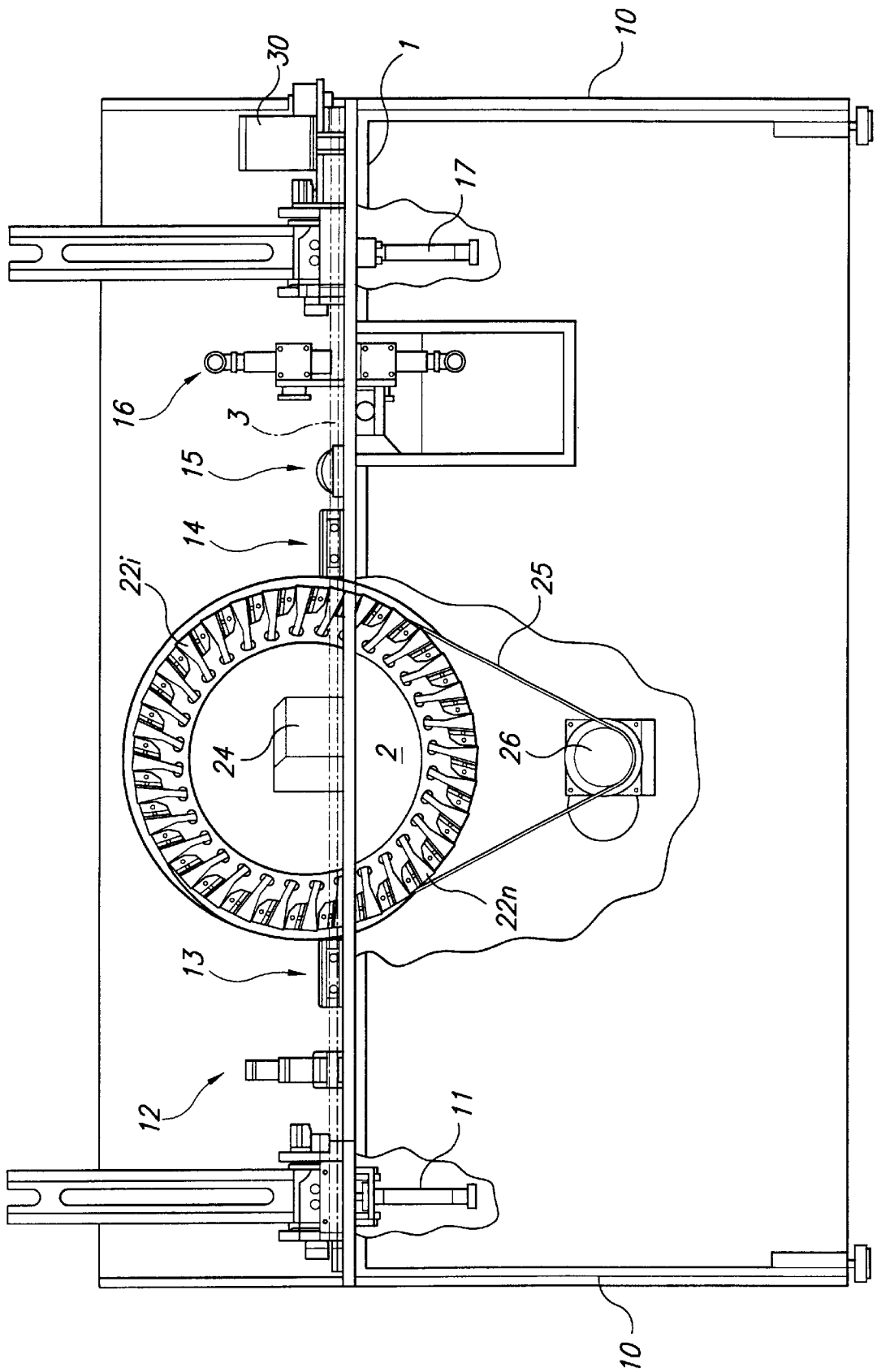
FIG. 1 shows a front view of the personalization machine.
Figure 2:
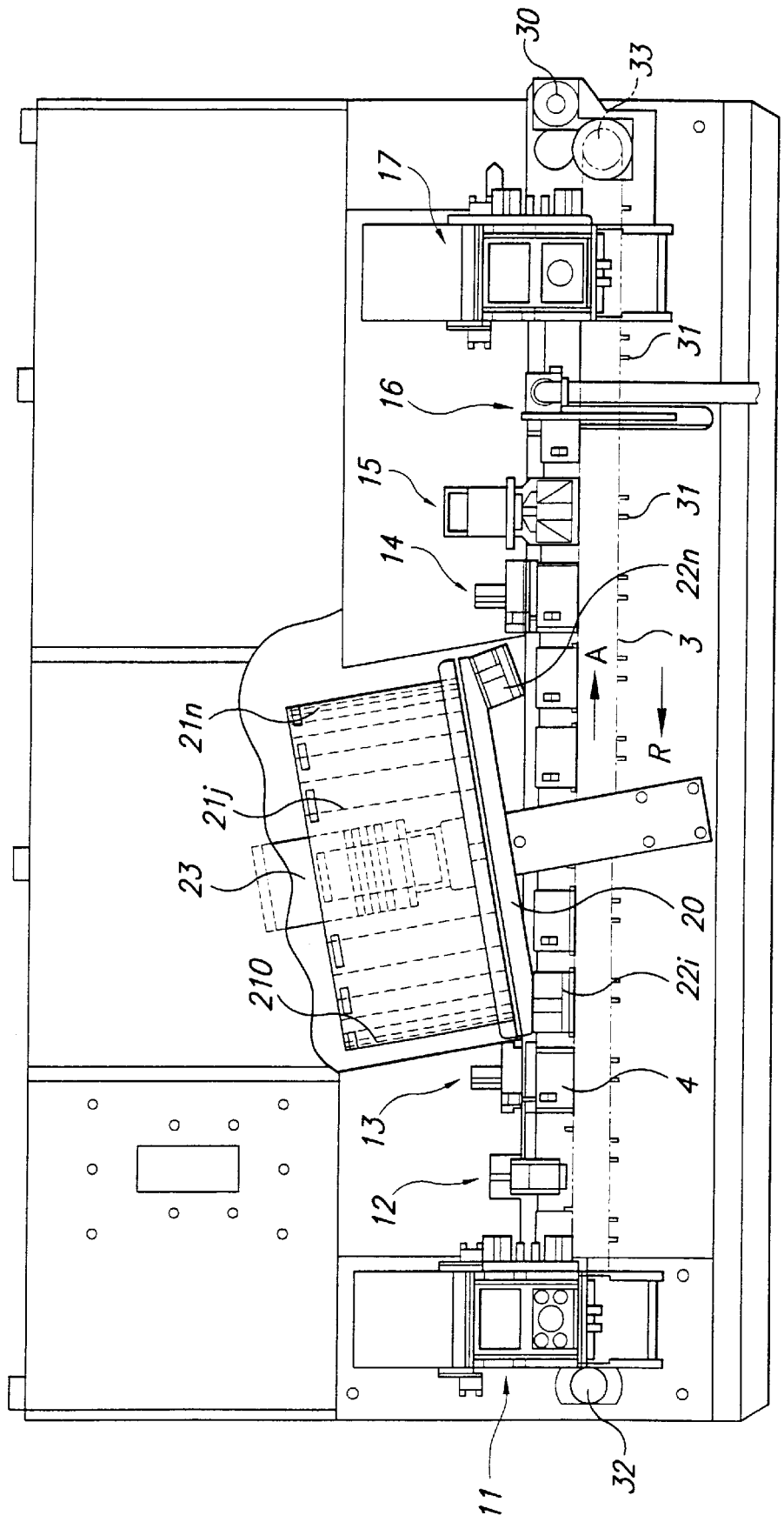
FIG. 2 shows a top view of the personalization machine.

The invention, which has just been described in connection with FIGS. 1–5, will first be described generally with respect to the front and side views of FIGS. 1–2. Here, the exemplary embodiment includes a table (1) that is mounted on legs (10), on the top on which there is a transfer path that is formed by a continuous notched belt (3) that runs between two vertical end pulleys (33, 32), one of which is driven by motor (30).

Figure 3:
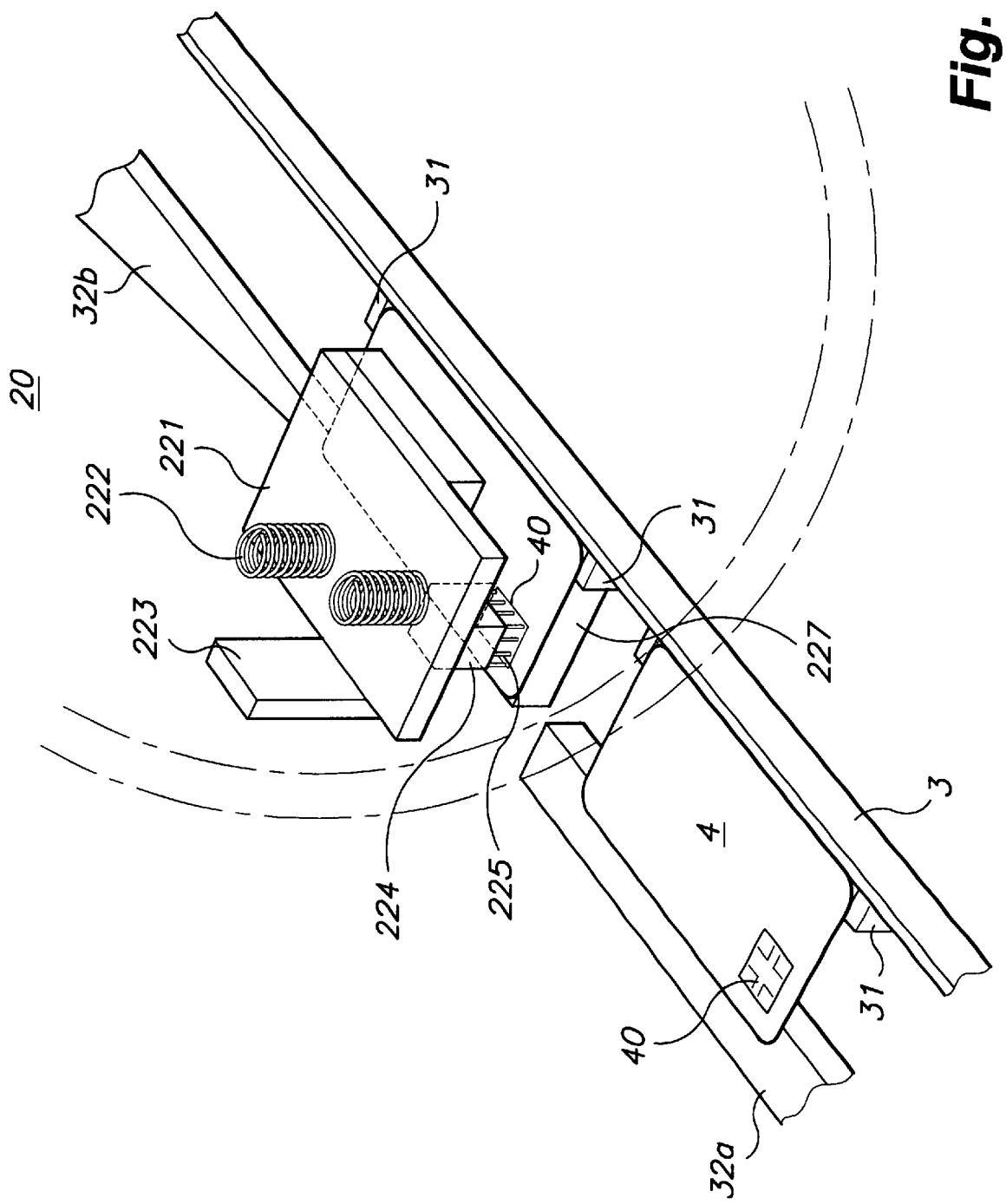
FIG. 3 shows a perspective view of the station for introducing the cards onto the personalization plate.
Figure 5:
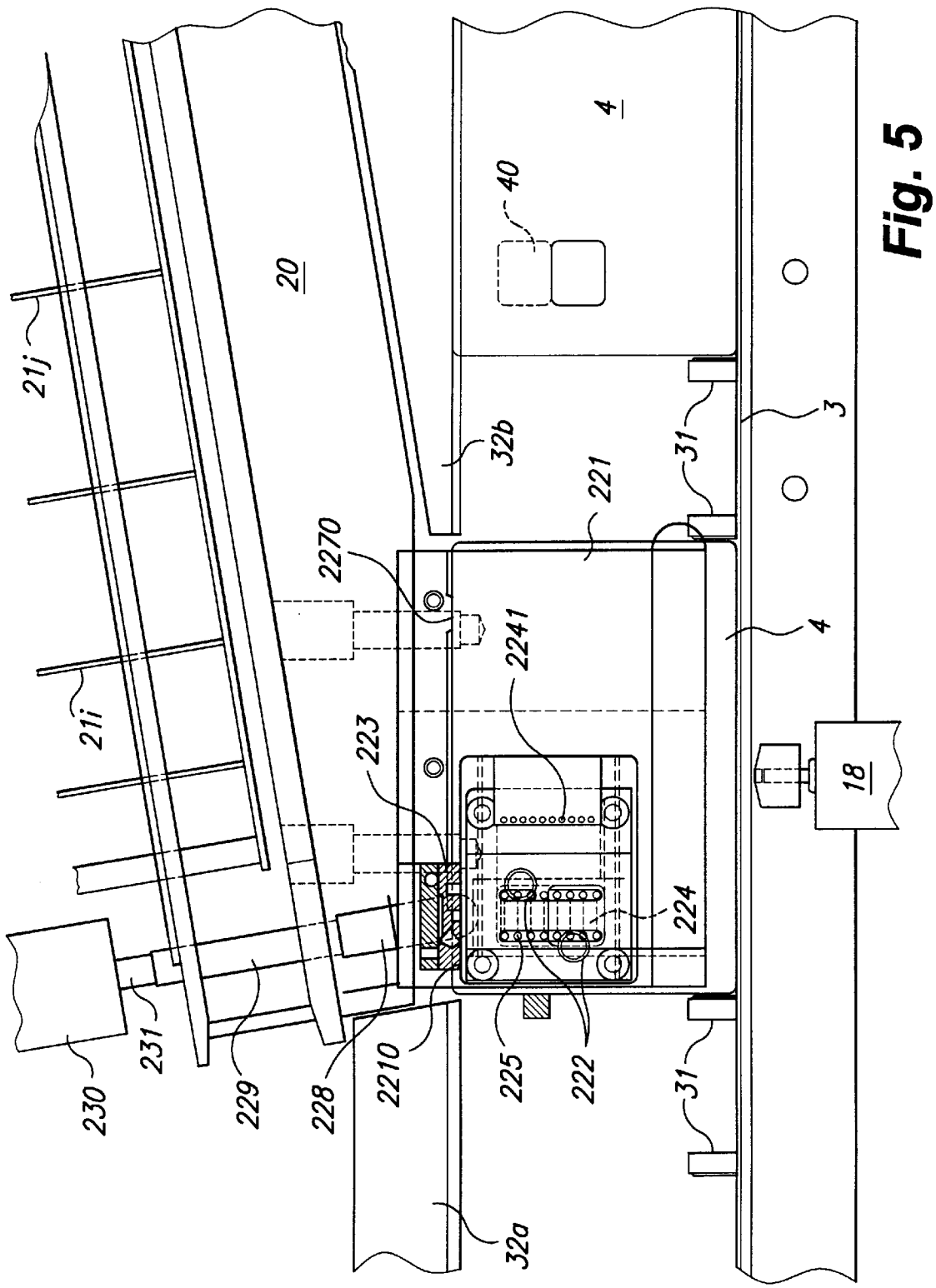
FIG. 5 shows a top view of the personalization plate and the transfer path.

On said endless belt (3) tappets (31) are mounted in pairs at regular intervals, whereby the distance between two adjacent tappets (31) corresponds to the length of a portable object (4) the size of a credit card, hereinafter referred to as a smart card including a microchip (40 in FIG. 3). Each pair of tappets (31) whose distance apart is equal to the length of a credit card is adjacent to the next pair, which is of a shorter length. Tappets (31) make it possible to hold portable objects (4) during their movement on the outward portion of the path indicated by arrow (A) in FIG. 2 and to drive the smart cards from one station to another. For further details regarding tappets (31) and the transfer device, the reader may refer to European patent application 0 589 771 from the same applicant. As shown in FIGS. 5 and 3, the transfer device is supplemented with support rails (32a, 32b), which are interrupted at the loading/unloading station to allow the passage of connecting heads (22i), which are integral with a turning plate (20), as will be explained below.

Figure 4:
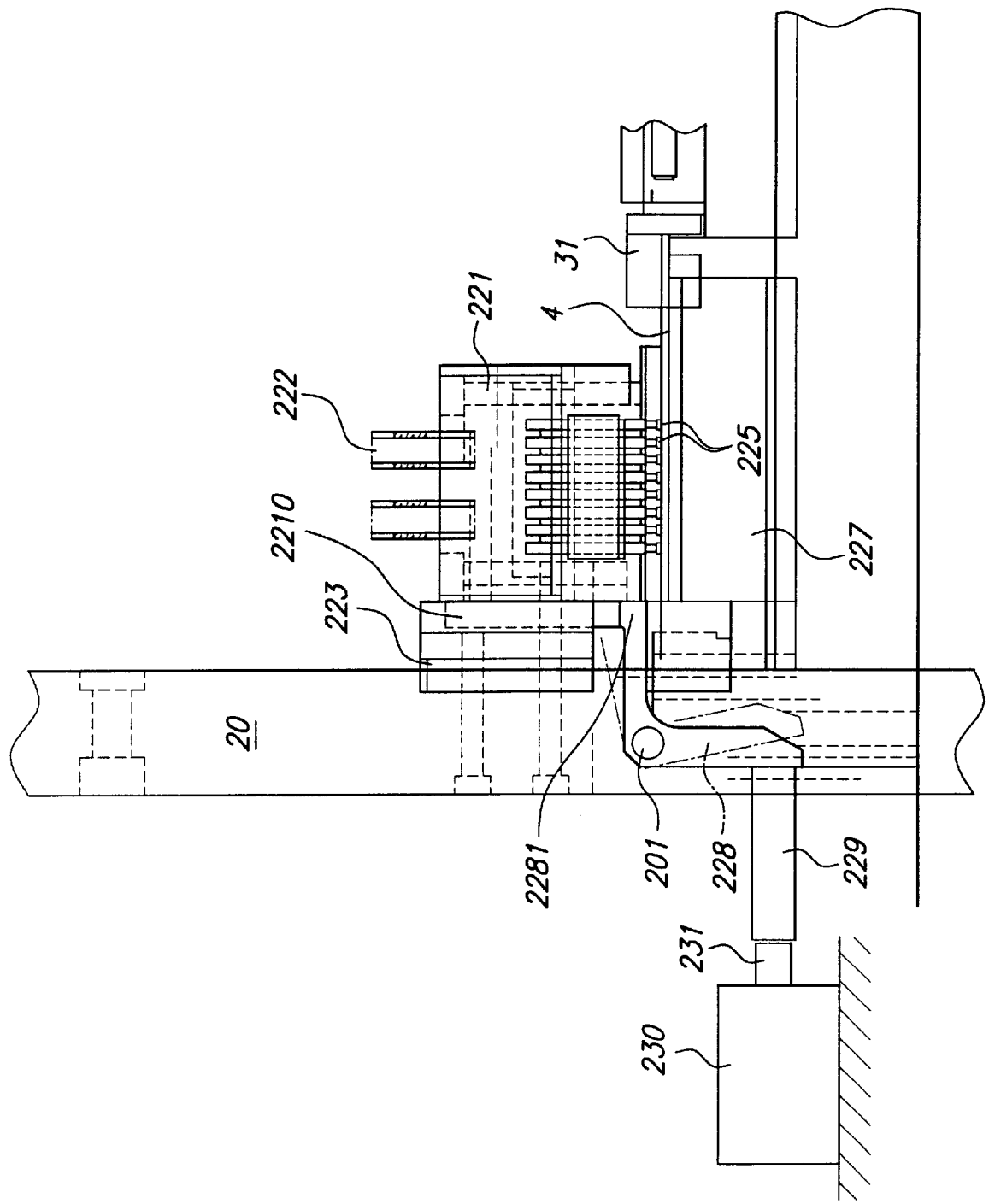
FIG. 4 shows a left view of one of the connecting heads of the personalization plate.

The table has an unstacking device (11) which, from a batch of stacked cards, distributes the cards and inserts them one by one between each pair of tappets (31). The cards, which are thus introduced into transfer path (A), are then brought to an electrical test station (12) that makes it possible, by a simple electrical test, to eliminate the defective cards, thereby ensuring quick initial detection within a period on the order of 0.5 sec. Unstacker (11) has a dual input magazine that makes it possible to continuously supply the machine, with the magazines being replaced during a blanked-out time. Each magazine is fixed and holds 500 cards. Tested cards (4) are then transferred to an ejection station (13), which makes it possible to eject the defective cards, thereby reducing the number of defective cards to 0.4%–0.2%. The cards that have successfully passed the electrical test are then transferred from ejection station (13) to personalization station (2). Said personalization station has a turning plate (20), whose axis of rotation is, on the one hand, horizontal and parallel to the plate of table (1) and, on the other hand, is inclined with respect to transfer path (A). As shown in FIGS. 3, 4 and 5, turning plate (20) has a truncated-cone section, whereby one side of the frustum of the cone is parallel to transfer path (A) owing to the inclination of the axis of rotation of the plate. On its circumference the inclined lateral face of the cone frustum supports a number of connecting devices (22i, 22n) in such a way that each connecting device (22i, 22n) can be inserted into the path of the cards between guide rail (32a) where the cards enter the personalization system and guide rail (32b) where the cards exit the personalization system. Connecting devices (22i) are slightly smaller in size than the cards and have a space between their edges and notched belt (3). An actuator device (18 in FIG. 5) makes it possible to push each card toward plate (20) (once said card has been brought between the two elements of connecting device (22i) so as to rest against reference surfaces (2270 in FIG. 5) of the lower fixed part (227) of the connecting device 22i as shown in FIG. 3. Each smart card (4) connecting device (22i) has a lower fixed plate (227) that is integral with the inclined face of the cone frustum of turning plate (20) and a guide column (223 in FIG. 3) which also is integral with plate (20) to guide an upper movable element (221 in FIG. 3) that supports a connecting head (224 in FIG. 3). Each connecting head (224) has a number of needles (225) that are mounted on elastic means and are electrically connected to a connector (2241 in FIG. 5) that provides the connection to a wire sheet that originates from an electronic card (21i in FIG. 5) for managing the connecting head (224). With each connecting head (224) of a connecting device (22i) is associated a personalization card (21i in FIG. 5) that is located on the opposite face of turning plate (20) and is radially oriented toward the center of said plate (20). Movable part (221) of smart card connecting device (22i) is permanently biased toward fixed part (227) by elastic means (222 in FIG. 3) that rest on a fixed part of plate (20). An L-shaped lever (228 in FIG. 4) makes it possible to act with its end (2281 in FIG. 4) on guide (2210 in FIGS. 4–5) which can slide in the guide column 223 which is integral with head (224 in FIG. 5) and movable part (221 in FIG. 3) in order to raise head (224) and provide between contact needles (225) and fixed part (227) a space that is sufficient to allow the passage of cards (4) that are transported by the transport path and notched belt (3). Lever (228) is activated in order to raise connecting head (224) by means of a finger (229 in FIG. 4), which is integral with turning plate (20) that is located in front of each lever (228) that is associated with each connecting device (22i). When connecting device (22i) is placed at the station for introducing and removing the cards, fitting into the transfer path between entry guide (32a) and exit guide (32b), the finger for actuating lever (228) is opposite an actuator (230) whose piston (231) lifts the heads. This makes it possible to free smart card (4), then, by moving belt (3) in the direction indicated by arrow (A), FIG. 2, to move the personalized card and at the same time to bring the next smart card into connecting device (22i), which has just completed personalization. In connection with FIGS. 1–2, leaving the plate, the personalized card is transported by belt (3) toward ejection station (14). Said ejection station (14) makes it possible to eliminate cards whose personalization is incomplete or faulty. If personalization has been successful, the card is transferred to turning station (15) to then allow it to be marked with ink on its other face by a marking station (16). Finally, the card is transported toward a conventional stacking device (17), where it is stacked in a magazine that has a dual function according to the same principle as unstacking device (11), but in the opposite direction. Turning plate (20) can thus have a large number of connecting devices (22i), each associated with a personalization card (21i) which manages the personalization of a smart card (4) that is inserted by transfer belt (3) into connecting device (22i) to which a given personalization card (21i) is attached. The plate can thus have, e.g., 32 or 16 connecting devices (22i) that are associated with an equal number of personalization cards. Each of the personalization cards is connected in a network to an on-board computer in the rack of the rotating plate. The PC-type on-board computer is connected to a second PC-type on-board computer that may or may not be located on the table of the machine. The link between the on-board system during rotation and the fixed installation is ensured by rotating collector contacts. The connection is made by fixed contacts that are integral with the fixed part of the machine, resting on a set of rotating tracks that are integral with the turning plate. Likewise, the power supplies that are necessary for the operation of the on-board hardware on the turning plate are provided by fixed contacts that rest on the supply tracks. This computer holds the software for managing the personalization of the cards and makes it possible to manage the ink marking as well.

Finally, another PC manages the sequential control of the machine and receives the data from the different positioning devices such as the angular position encoder of plate (20), whereby the different detection devices make it possible to ensure the positioning of a card that is transported by belt (3) at a point opposite the appropriate station and to detect the position of belt (3). The axis of rotation of plate (20) is driven by a synchronous motor (26 in FIG. 1) via a transmission by notched belt (25). The positions of connecting devices (22*i*) are tracked by an absolute position encoder, not shown.

When in operation, belt transport device (3) picks up a card (4) whose personalization is completed from turning plate (20) and inserts a new smart card into connecting device (22*i*) whose position has just been vacated, and then after insertion a rotation of one incremental position of plate (20) is carried out. Personalization takes at least the entire rotation time of one complete turn, and after one complete turn of plate (20) the personalized card is replaced in the transfer path between two vacant tappets (31). Then said card is removed from connecting device (22*i*) by the movement of transfer belt (3) after head (224) and pressing device or movable element (221) are raised again. When plate (20) has a set of 32 connecting devices and when the speed of travel between one station and another is on the order of one card per second, the machine makes it possible to provide a personalization throughput of 3000 cards per hour, with a maximum personalization time on the order of 32 seconds.

In a variation of the invention, of the 32 positions for inserting cards, only 30 connecting devices that are normally provided for personalization are used. As a matter of fact, in this version two stand-by heads are loaded with one card apiece when they pass the loading station. As long as the personalizations done on the 30 other heads remain without incident, these two heads remain unused. When during the personalization of a card a personalization problem is detected, the communication card signals this situation to the PC, which immediately initiates the replacement process, ensuring the personalization of one of the cards located in the stand-by heads. The PC selects the head located closest to the loading station in the direction of rotation of the plate. The card number in the process of continuous numbering that was assigned to the defective card is thus assigned to the card that is used in the selected stand-by head, and the personalization of this card is carried out. All of the cards whose personalization was underway and are located downstream from the defective card, i.e., were previously introduced onto turning plate (20), are unloaded as they come up to the loading/unloading station and are replaced by cards brought in by transfer belt (3). The defective card is carried by transfer belt (3) to ejection station (14), where it is ejected. Personalization plate (20) waits until the personalization of the designated replacement card in the stand-by head is completed. When the personalization of this card is completed, plate (20) is driven in rotation in order to bring the corresponding backup head into the advance of transfer path (3). The replacement card is thus removed, and then the rotation of the plate again moves forward in order to bring the plate into the position for unloading the first card behind the defective card whose personalization has been completed.

With this mode of operation, it is thus possible to personalize the cards while ensuring that the numbers recorded on the cards form a continuous sequence even if a card turns out to be defective and has not been personalized. This makes it possible to absorb an average of 6% defective cards, i.e., 2 positions out of 30, while the defect rate that remains after the first electrical test at station (12) is generally 0.2%. For a rate of 0.2%, the loss of speed for the machine is a maximum of 200 cards per hour. With this machine it is thus possible to obtain high personalization rates of close to 3000 cards per hour. In the applications where it is necessary to do so, it is possible to ensure that the personalized cards have a series of numbers that form a continuous sequence. The cards that have not been personalized are ejected during the course of the process. Each connecting device position is detected by the coder, smart cards (4) that are introduced onto turning plate (20) are tracked by the PC-type computer that is connected to turning plate (20) by its communication card, and the computer will modify the normal operating sequence of the machine, replacing it with the replacement sequence when the detection of a defective card is signaled by one of electronic personalization cards (21*i*) that is associated with a connecting head (22*i*).

Of course, the invention is not limited to the above-described embodiment. Thus, the axis of rotation of turning plate (20) can have a very different orientation with respect to transfer path (A), with its shape being consequently adapted in such a way that each connecting device (22*i*, 22*n*) can come into the path of the cards between guide rail (32*a*) for the cards to enter the personalization system and guide rail (32*b*) for the cards to leave the personalization system.

For example, the axis of rotation of plate (20) can be essentially parallel to transfer path (A), with connecting devices (22*i*, 22*n*) being distributed radially over the peripheral surface of plate (20), which may be cylindrical.

Other modifications that are within the grasp of one skilled in the art are also part of the spirit of the invention.

We claim:

1. A high-speed personalization machine with a transfer line for personalizing portable objects incorporating an integrated circuit having at least one memory, said machine comprising:

a turning plate including a plurality of connecting devices, and electronic personalization cards, each card being connectable to one of said portable objects through a respectively corresponding connecting device, each electronic card being connected to a computerized management system which manages all of the personalization electronic cards, said turning plate having an axis of rotation that is inclined with respect to the transfer line so that each connecting device rotates to a loading and unloading position interrupting the transfer line, the connecting devices being arranged on one side of the turning plate and the electronic cards being arranged radially with respect to the turning plate on the other side of the turning plate.

2. A high-speed personalization machine as in claim 1 wherein:

each connecting device includes a fixed plate and a movable element supporting a connecting head having a plurality of needles elastically mounted and electrically connected to a respectively corresponding electronic card, whereby said movable element is continuously biased in the direction of the fixed plate and actuated by activation means to raise its head providing sufficient space between needles and fixed plate to allow the passage of said portable objects.

3. A high-speed personalization machine as in claim 2 wherein each connecting device is brought, in succession, to a loading and unloading station by a rotational movement of the turning plate.

4. A high-speed personalization machine as in claim 2 wherein said turning plate has driving and angular positioning means that make it possible to stop each connecting device in alignment with guide means for the transport of the portable objects thereinto.

5. A high-speed personalization machine as in claim 1 wherein said turning plate has the shape of a truncated cone, such that one face of the truncated cone is parallel to the transfer device.

6. A high-speed personalization machine as in claim 1 further comprising means for controlling the advance of said turning plate from one station to the next station of a transfer device and for stopping a portable object opposite one of said connecting devices which is inserted into the transfer line path of the portable object.

7. A high-speed personalization machine as in claim 1 further comprising means for controlling sequencing and means for management of the personalization machine.

8. A high-speed personalization machine as in claim 1 further comprising:

sequencing control means that triggers a replacement sequence when personalization management means signal a problem with personalization on a portable object;

at least one said connecting device being kept in a backup position on the turning plate and being loaded with a backup portable object, whereby said personalization management means triggers personalization of the portable object in this backup position when the management means have detected a personalization problem on a defective portable object placed in a connecting device;

the sequencing control means ensuring the unloading of personalized portable objects that are located in front of the defective portable object and then the unloading of the defective portable object, as well as a personalization cycle on the portable object in the backup position, which at the end of its personalization cycle is unloaded onto the transfer device;

the sequencing control means then ensuring the loading of a new backup portable object in this first unloaded backup position before returning to the position that makes it possible to unload the portable object that is located immediately behind the earlier-detected defective portable object.

9. A machine as in claim 8 wherein:

a card unstacking device is disposed at an entrance to the high-speed personalization machine, a stacking device is disposed at an exit from the high-speed personalization machine, an electrical test station is disposed between the station for loading and the unstacking device, and an ejection station is disposed in front of the station for loading.

10. A machine as in claim 9 wherein there is a second ejection station at an exit from the turning plate.

11. A machine as in claim 10 wherein the second ejection station is active when a portable object whose personalization has been faulty moves past this station.

12. A machine as in claim 10 wherein, downstream from the second ejection station, which is located downstream from said turning plate, a return station is associated with an ink marking plate and card stacking device.

* * * * *